United States Patent
Zajac

[11] 3,843,144
[45] Oct. 22, 1974

[54] AUTOMATIC SCREW MACHINE TOOL HOLDER

[76] Inventor: Chester S. Zajac, 8010 Sierra Oval, Parma, Ohio 44130

[22] Filed: Apr. 20, 1972

[21] Appl. No.: 245,770

[52] U.S. Cl. .................. 279/51, 279/15, 279/53
[51] Int. Cl. ............................................ B23b 31/20
[58] Field of Search ........ 408/239, 240; 279/53, 52, 279/51, 15, 59

[56] References Cited
UNITED STATES PATENTS

| | | | |
|---|---|---|---|
| 339,595 | 4/1886 | Stone | 279/1 S |
| 2,552,772 | 5/1951 | Fasig | 279/53 |
| 2,755,094 | 7/1956 | Benjamin | 279/51 |

Primary Examiner—Gil Weidenfeld
Attorney, Agent, or Firm—George S. Baldwin et al.

[57] ABSTRACT

An automatic screw machine tool holder having an elongated sleeve in which a tool is releasably retained in the sleeve bore by means of a collet. The tool and collet assembly are releasably secured in the sleeve by means of a lock stud threaded in the outer end of the sleeve, such stud acting on a sleeve insert which, in turn, contacts on the collet.

The sleeve bore longitudinal wall and the collet outer longitudinal wall have coacting tapered surfaces enabling the collet to grip the tool when the collet (with the tool therein) is forced into operative position in the sleeve bore by the insert and lock stud. The stud has an internal threaded longitudinal bore receiving a threaded bolt therethrough, which passes through the longitudinal bore of the insert and contacts the tool, whereby the tool may be secured in a preselected longitudinal position in the collet (and, in turn, the sleeve bore). In the preferred form, the collet is formed of coacting sets of flexible fingers at each end of the collet which function, in coaction with the tapered surfaces, to grip the tool throughout the entire length of the collet.

1 Claim, 3 Drawing Figures

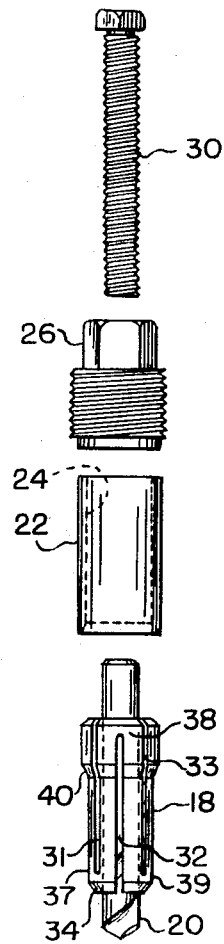
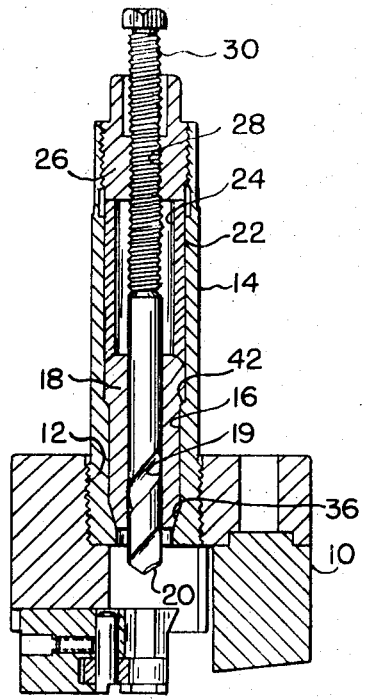
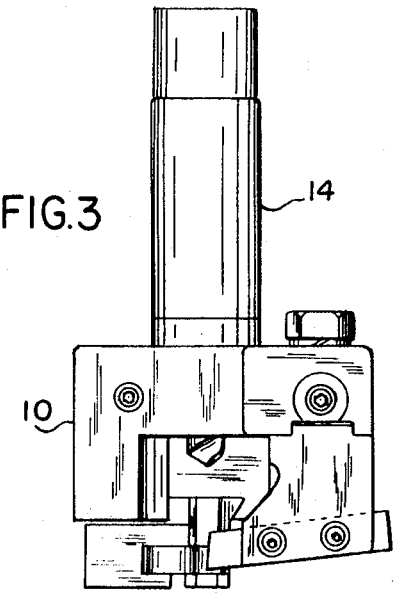
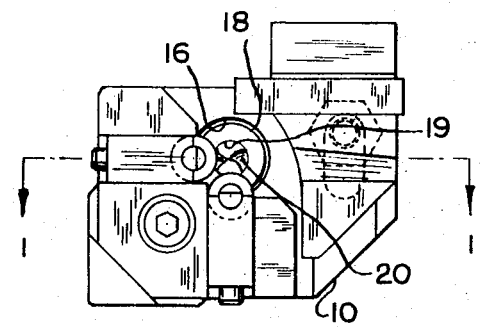
FIG. 1
FIG. 2
FIG. 3

AUTOMATIC SCREW MACHINE TOOL HOLDER

This invention relates to tool holders, and more particularly to an automatic screw machine tool holder adapted to releasably retain an elongated tool therein.

In automatic screw machine tool holders, there has long been a need for a simple, effective means for releasably retaining the tool in the holder. Lock or set screws acting on the shank of the tool are commonly used, but such structure does not retain the tool securely in position under all operating conditions and is not ideally effective for quick release of the tool.

Accordingly, it is an object of the invention to provide an automatic screw machine tool holder having means for securely retaining a tool therein under all normal operating conditions.

A further object of the invention is to provide a tool holder of the above type wherein the tool may be quickly and simply released from operative position and removed from the tool holder.

A further object of the invention is to provide a tool holder of the above type wherein the tool may be quickly and simply disposed in precise, exact operative position in the tool holder.

A further object of the invention is to provide a tool holder of the above type that is simple in construction, inexpensive to manufacture, and highly effective in operation.

Briefly, the foregoing objects are accomplished by the provision of an automatic screw machine tool holder having a collet for releasably retaining a tool in the holder. The tool holder includes a body having an open-ended bore in which one end of an elongated tool receiving sleeve is disposed, whereby the sleeve is thus secured to the body and extends outwardly therefrom. The sleeve has a longitudinal open-ended bore in which is received a collet (with a tool therein), a sleeve insert contacting the collet, and a lock stud contacting the insert and threaded into the outer end of the sleeve bore to retain the collet and tool in operative position therein. The sleeve bore wall and the collet outer longitudinal wall have coacting tapered surfaces enabling the collet to grip the tool when the collet is forced into operative position in the sleeve bore by the insert and stud.

The stud has a threaded longitudinal bore receiving a threaded bolt which passes through the insert and contacts the tool. With this construction, the tool may be secured in precise preselected longitudinal position in the collet (and, in turn, in the tool holder) simply by adjusting the bolt and then finally tightening the stud in the end of the sleeve bore.

In the preferred form, the collet is formed of coacting sets of radially flexible fingers at each end of the collet, which function to grip the tool throughout the entire length of the collet. Additionally, there are two spaced sets of the aforementioned coacting tapered surfaces to enable the separate sets of flexible fingers at each end of the collet to independently grip the tool.

Thus, the invention provides an automatic screw machine tool holder that firmly retains the tool in precise operative position under all normal operating conditions. The tool may be quickly set in exact operating position any may be quickly released therefrom in preparation for insertion of the next tool.

Other objects and advantages of the invention will be apparent from the following description taken in conjunction with the drawings wherein:

FIG. 1 is a front elevational sectional view (taken along the line 1–1 of FIG. 2) of an automatic screw machine tool holder constructed in accordance with the invention;

FIG. 2 is a bottom view of the holder shown in FIG. 1; and

FIG. 3 is a front elevational exploded view of the holder shown in FIG. 1, and showing the position of the parts prior to assembly of a tool in the holder.

Although the invention is shown and described herein with reference to an automatic screw machine tool holder retaining a drill, it will be understood that it may be applied to any like tool holder retaining any type of elongated tool.

The terms and expressions which are employed are used as terms of description, and not of limitation, and there is no intention, in the use of such terms and expressions, of excluding any equivalents of the features shown or described, or portions thereof, but it is recognized that various modifications are possible within the scope of the invention claimed.

Referring to the drawings, there is shown an automatic screw machine tool holder of the invention and including a body 10 having an open-ended threaded bore 12 in which is threaded one end of an elongated cylindrical tool-holding sleeve 14, such that the sleeve is secured to the body 10 and extends outwardly therefrom. The sleeve 14 has an open-ended, tool-receiving bore 16 extending longitudinally therethrough. A spring collet 18 is slidably disposed in the sleeve bore 16 for gripping an elongated tool (in the collet bore 19) such as, for example, a drill 20, in a manner to be described.

Also slidably disposed in the sleeve bore 16 above the collet 18 and in contact therewith is a hollow, cylindrical sleeve insert 22 having a longitudinal bore 24. A collet locking screw or threaded lock stud 26 is threadedly disposed in the top open end of the sleeve bore 16, such lock stud acting against the insert 22 which, in turn, acts against the collet 18 to lock it in the sleeve 14 and with the tool 20 locked in the collet. Such stud and insert comprise means for releasably retaining the collet (and tool) in operative position.

The stud 26 has an internal longitudinal threaded bore 28 in which a threaded bolt 30 is threadedly received. The bolt 30 extends through the insert bore 24 and contacts the tool or drill 20, such that the drill may be disposed in a preselected longitudinal position in the collet just prior to the final tightening of the stud 26.

As best shown in FIG. 3, the collet 18 is formed of coacting sets of radially flexible fingers at each end of the collet which function to grip the tool 20 throughout the entire length of the collet. More specifically, the collet slot 31 is open-ended at the top of the collet, the collet slot 32 is open-ended at the bottom of the collet, the collet slot 33 is open-ended at the top of the collet, and so on around the collet. Such alternate open-end slot construction provides a resilient finger 37 having its lower end portion radially flexible, thence the finger 38 having its upper end portion radially flexible, thence the finger 39 having its lower end portion radially flexible, and so on around the collet.

The lower end of the collet 18 has a tapered surface 34 which coacts with the sleeve bore tapered surface 36, and adjacent the upper end of the collet is a tapered shoulder or surface 40 which coacts with the sleeve bore tapered surface 42, such coacting tapered surface, respectively, enabling the collet to grip the tool in coaction with the aforedescribed radially flexible collet fingers. With this construction, the flexible fingers at each end of the collet independently grip the tool 20.

What is claimed is:

1. An automatic screw machine tool holder comprising; a tool holder body having an open-ended bore; an elongated sleeve having one end disposed in the open-ended bore, whereby the sleeve is secured to the body and extends outwardly therefrom; said sleeve having a longitudinal tool-receiving bore therein; a collet operatively disposed in the tool-receiving bore for gripping an associated elongated tool in operative position therein; a hollow cylindrical sleeve insert slidably disposed in the open-ended bore outwardly of the insert and contacting the same; and a lock stud threaded into the outer end of the open-ended bore and contacting the insert; the open-ended bore longitudinal wall and the collet outer longitudinal wall having coacting tapered surfaces enabling the collet to grip the tool when the collet, with the tool therein, is forced into operative position in the open-ended bore by the insert and stud, the stud having a threaded longitudinal bore, and further including a bolt threaded into such stud bore and passing through the insert and operatively contacting the tool, whereby the tool may be secured in preselected longitudinal position in the collet, said collet being formed of coacting sets of radially flexible fingers at each end of the collet which function to grip the tool throughout the length of the collet, there being two sets of said coacting tapered surfaces enabling the sets of flexible fingers at each end of the collet to independently grip the tool.

* * * * *